United States Patent [19]
Thomas et al.

[11] Patent Number: 5,196,061
[45] Date of Patent: Mar. 23, 1993

[54] CEMENTITIOUS COMPOSITE THAT INCLUDES DELIGNIFIED CELLULOSIC MATERIAL AND PROCESS OF MAKING IT

[76] Inventors: Robert C. Thomas, 18 Foxglove Way, Irvine, Calif. 92715; Craig O. Thomas, Apt. 1, 853 Auburn Rd., Groton, N.Y. 13070

[21] Appl. No.: 514,831

[22] Filed: Apr. 26, 1990

Related U.S. Application Data

[63] Continuation-in-part of Ser. No. 274,617, Nov. 22, 1988, Pat. No. 4,920,312, which is a continuation of Ser. No. 144,565, Jan. 15, 1988, abandoned.

[51] Int. Cl.$^5$ .............................................. C04B 18/24
[52] U.S. Cl. ................................... 106/697; 106/731; 106/805
[58] Field of Search .................. 106/731, 805, 697

[56] References Cited

U.S. PATENT DOCUMENTS

| | | | |
|---|---|---|---|
| 1,259,502 | 3/1918 | Farr | 106/731 |
| 2,175,568 | 10/1939 | Haustein | 106/805 |
| 3,264,125 | 8/1966 | Bourlin | 106/805 |
| 3,403,205 | 9/1968 | Ottenholm | 106/805 |
| 3,753,749 | 8/1973 | Nutt | 106/731 |
| 3,841,885 | 10/1974 | Jackel | 106/731 |
| 4,402,751 | 9/1983 | Wilde | 106/805 |
| 4,497,688 | 2/1985 | Schaefer | 106/731 |

OTHER PUBLICATIONS

Taylor, *Concrete Technology and Practice*, Amer. Elsvier Pub. Co., Inc., New York, 1966.

*Primary Examiner*—David Brunsman
*Attorney, Agent, or Firm*—Christie, Parker & Hale

[57] ABSTRACT

A cementitious composite of delignified cellulosic debris and Portland cement is produced from waste sludge from a paper recycling process and combining the resultant material in particle sizes ranging from 0.06 to 25 mm with Portland cement.

22 Claims, No Drawings

CEMENTITIOUS COMPOSITE THAT INCLUDES DELIGNIFIED CELLULOSIC MATERIAL AND PROCESS OF MAKING IT

This application is a continuation-in-part of application Ser. No. 07/274,617 filed Nov. 22, 1988, now U.S. Pat. No. 4,920,312 which in turn is a continuation application of application Ser. No. 07/144,565, filed Jan. 15, 1988 now abandoned.

FIELD OF THE INVENTION

The present invention relates to a cementitious composition using waste cellulose material and a method for making the composition and, in particular to such a composition and method using sludge from a paper recycling plant and portland cement.

BACKGROUND OF THE INVENTION

The wastewater sludge used in this invention is a byproduct of paper recycling plants that produce recycled pulp. The waste sludge contains water, delignified cellulose debris, clay from paper coatings, dirt and other undesirable constituents. Until this invention, the sludge had no practical use; it had to be disposed of in land fills as waste. Recycling plants are producing well over 400 tons of the sludge each day.

Although local regulations and conditions vary between recycling plants, the trend is very clear that current disposal methods and landfill use will become more restricted and costly.

Today, there is an ever increasing emphasis on resource recovery and recycling. As a consequence, it is more and more necessary to capture or recover all cellulose fiber material that can be used in paper manufacture and to improve the yield and quality of the recovered secondary fibers. Not all of the cellulose fiber material can be used in the manufacture of paper. The unusable cellulosic debris is fractured, broken, frayed and split into very small particles. The cellulose debris particles have an aspect ratio (length to width ratio) generally less than 100-to-1 and are shorter than 0.5 cm i.e., 50 mm. The ASTM definition of a fiber does not include this material because the definition requires a greater length and greater aspect ratio; according to the ASTM definition a fiber has a length of at least 0.5cm and an aspect ratio of 100-to-1 or greater. Accordingly, cellulose debris from paper recycling is not fibrous despite the fact that the material recovered in such recycling is fibrous.

The wastewater sludge from fiber recovery contains three to six percent solids by weight. For waste disposal, the sludge is dewatered to 25-40 percent solids.

A typical recycling plant mechanically de-inks and repulps waste paper. The waste paper raw material is primarily bond, ledger, and color ledger materials. After de-inking and repulping, the pulp is bleached, yielding a clean, bright, recycled pulp Bleaching in the paper industry is any process where residual lignin or hemicellulose or color bodies are removed by any means from the cellulose fibers. Bleaching can be accomplished chemically or mechanically and chemically.

Wastewater treatment recycles much of the process water back to the recovery process. Wastewater treatment typically includes chemical and physical treatment, secondary biological treatment and secondary clarification. In addition to solids removed in the wastewater treatment process, there is a solids removal step internal to de-inking that produces more waste; the waste is combined with waste from wastewater treatment to produce the three to six percent solid wastewater sludge. This sludge has polyelectrolytes added and is dewatered to a solids content of 25 to 40 percent by weight. This sludge has a high biological activity. The solid matter in the sludge is about 55 percent cellulose debris, 45 percent kaolinitic clay, including one percent other impurities. The cellulose debris has been stripped of lignin, leaving hollow tubes that collapse into long, flat ribbons. The individual particles of the debris are also severely splintered or fibrillated along their lengths. As previously pointed out, the particle size of the cellulosic debris is less than 0.5 cm with an aspect ratio of less than 100-to-1.

Organic fibers have been used to reinforce building compositions since prehistoric clay bricks were reinforced with straw. For example, U.S. Pat. No. 4,402,751 to Wilde discloses a method for using waste cellulose fibers such as wood pulp, rag pulp and linen pulp from sludge to form a cementitious composition. Wilde uses lime to prevent biological decomposition of cellulose. The lime does not delignify the cellulose; it simply encapsulates it.

SUMMARY OF THE INVENTION

The present invention makes constructive use of sludge which would otherwise be wasted. The invention also provides a cementitious composite having greater flexibility than conventional cement, stone, and composites.

The present invention contemplates a method for making cementitious composites and the composites themselves from waste sludge at a paper recycling plant. This sludge has water delignified cellulose debris, and other materials, such as clay. The particles of cellulose in the debris have lengths less than 0.5 cm and aspect ratios less than 100-to-1. In general, the invention includes mixing the sludge with Portland cement and curing the cellulose debris-concrete mixture to form the desired building materials. The composition may be enhanced by adding fly-ash and other minerals such as fine silica sand and by dewatering the mixture before curing.

In one aspect, the present invention takes dewatered and delignified sludge from wastewater treatment of a paper recycling plant that would otherwise have to be disposed of, and at the site adds it to cement, and casts the composite into bricks or the like. The sludge solids content is preferably around 35 percent. The solids are about 65 percent delignified cellulose debris and 35 percent kaolinitic clay. The cellulose debris has particle sizes of less than 0.5 cm and aspect ratios of less than 100-to-1. The sludge is mixed with Portland cement with its cellulose debris volume fractions varying from approximately 5 to 20 percent. Maximum tensile strength occurs with a cellulose debris volume of 11 percent, and for this reason such a cellulose debris content is preferred. Water is added to get a water content expressed as a weight fraction of the Portland cement of approximately 0.65. Mixing the sludge with cement soon after sludge generation prevents biological degradation of the cellulose, and is therefore preferred; this on-site mixing also eliminates sludge shipping costs. Any retardation in setting rate and strength development may be offset by the use of high early strength Portland cement. Type III High Early Strength cement worked well in a test.

In a particular form, the present invention contemplates using the low solids and high water mixture of the sludge from a paper recycling process and mixing the mixture with Portland cement such that a distribution of the constituents allows the cement to contact with the surface of the cellulose debris of the sludge and form a strong bond upon curing. The cement and debris mixture is dewatered by the cement. The cement also accelerates the separation of the water from the sludge. The resulting composite of cement and cellulose debris is further dewatered, as by vacuum dewatering, to form a plastic mass. This mass is easy to handle. The mass may be molded by vibratory pressure molding to achieve the low water-to-cement ratio, which is the highest strength of the cellulose cement composite.

The present invention achieves substantial advantages. Included in these advantages, is the conversion of what would otherwise be waste sludge from a paper recycling plant into a useful product. Accordingly, the volume of waste that must be disposed of is reduced. The cellulose-Portland cement composite has a considerably higher ultimate compression strength than most Portland cement composites. When a sample of the composite of this invention is subjected to a compressive load to the point of compressive failure and unloaded, the composite will still be intact; upon reloading, the failed sample will take a substantial portion of the prior loading before further permanent deformation. Ordinary Portland cement composites disintegrate at compressive failure.

These and other features, aspects, and advantages will become more apparent from the following detailed description, examples and claims.

DETAILED DESCRIPTION OF THE INVENTION

The present invention uses delignified cellulose debris from sludge produced by the recycling of paper in combination with conventional Portland cement to create a cementitious composition suitable for use as a construction material.

In a preferred embodiment, the cellulose source is the sludge from a paper recycling plant. As described in the Background of the Invention section of this specification, in a paper recycling plant, waste paper products are de-inked, repulped and bleached to produce useful pulp. This process produces wastewater. The wastewater is clarified for reuse, but the clarification process produces a sludge. The sludge is 95 percent water until it is mechanically dewatered, typically in a belt filter press. After the dewatering, the sludge can have as little as about 60 percent water.

The solid part of the sludge is about 55 percent cellulose from the paper pulp, about 45 percent kaolinitic clay from paper coatings, including about 1 percent miscellaneous impurities, typically, dye and ink residue. The cellulose is stripped of substantially all sugars and lignin because of the bleaching that occurs during the production of recycled pulp. The delignification converts the cellulose of the sludge into hollow tubes that collapse into long, fibrillated flat ribbons. The cellulose of the sludge has been fractured, broken, frayed and split into very small particles. These particles have a length of less than 0.5 cm and an aspect ratio (length-to-diameter ratio) of less than 100-to-1. The delignified ribbons mix readily, are relatively inert, and do not benefit from pH balancing with lime or from dying before they are mixed with the Portland cement. Lime can be used to prevent decomposition of the cellulose if the sludge is to be stored for long periods before being mixed with Portland cement. The splintering of the ribbons occurs during the delignification process and in the repulping, cleaning, screening and production of the secondary fiber pulp. The splintered ribbons may aid mechanical adhesion to the cement matrix. In addition, the cellulose particles are very small. Normally, the particles are from 0.06 to 25 millimeters long and 4 to 0.2 micrometers wide; the average being approximately 1.4 millimeters long and 3 micrometers wide. In contrast, fibers are at least 5.0 millimeters long, according to ASTM definitions.

In a specific embodiment, the sludge obtained from the paper recycling plant is combined with wet portland type cement at the plant. The cement is watered to improve mixing. In the sludge, about two thirds of the water is absorbed in the cellulose leaving only about one third available for mixing with the cement. Watering the cement with free water before adding the sludge ensures that the cement is completely watered. The best mixing of sludge and cement is obtained when the sludge is at least 60 percent water. If the sludge is dewatered substantially more than 60 percent, the cellulose particles tend to ball up. The balls of cellulose exclude cement so the resulting mixture is less homogenous. The resulting pockets of cellulose and pockets of cement are not as strong as an even mixture of the two. The final mixture is dewatered, cured and dried in the desired forms. The final dewatering and drying eliminates much of the water from the solids in the sludge without adversely affecting the homogeneity of the final mixture.

Bricks made using this process have been tested and compared to typical cement, stone and sand concrete bricks. Bricks made of the cementitious composition of the present invention withstand substantially more axial strain and are substantially more flexible; they have a much higher Young's modulus. The bricks can also be sawed and drilled with conventional woodworking equipment. These properties make the material suitable for use in blocks, shingles and wallboards.

Strength tests on different formulations have shown that the optimal cellulose content is 11 percent. The tensile strength of the composition increases with increasing cellulose content up to 11 percent cellulose. Strength falls off with cellulose content above 11 percent. If more than 11 percent cellulose is used, the cellulose tends to ball up, preventing the composite from evenly mixing.

Abrasion and wear resistance can be improved with the addition of another ingredient in the mix, for example, fine silica sand. Sand particles between 0.59 mm and 1.0 mm mixed with the sludge two parts sludge to one part sand by weight contribute significantly to the durability of the composite. Other ingredients may also be added to the cementitious composite according to the user's needs. Lightweight fillers, such as vermiculite, for example, reduce the composite's density.

The sludge mixes best when it contains no more than 75 percent water. Since wastewater sludge from a paper recycling process typically contains 95 percent water, the sludge must be dewatered before it is mixed with cement. Mixing is enhanced when the Portland cement is first mixed with water before being mixed with the sludge. Water obtained from dewatering the sludge can be used to water the Portland cement. While the mixture of sludge with 75 percent water and watered Portland cement is homogeneous, it contains excess water and must also be dewatered. Water obtained from this dewatering process can also be recycled back to water the Portland cement before it is mixed with the dewatered sludge.

Dewatering the cement and cellulose debris composite, as by vacuum dewatering, forms a plastic mass that handles easily. This plastic mass can be vibratory pressure molded into desired shapes; the fibration reduces the water-to-cement ratio, which results in a higher strength cellulose debris composite.

Example I

Sludge produced by a treatment process at a paper recycling plant was dewatered to a total solids content of 35 percent, and mixed with Type III, high early strength Portland cement. The cellulose debris volume fractions of the mixture varied from approximately 5 to 20 percent. Although the sludge had a high water content, additional water was required to develop a workable mix. The total water content expressed as a weight fraction of the cement content was approximately 0.65.

Five-centimeter (2-in.) cubes were cast for testing compression strength in accordance with ASTM C-109, and 2.5 cm (1-in.) briquettes were cast for tensile strength testing in accordance with ASTM C-190. All specimens were maintained in moist storage for 28 days, and then allowed to air-dry at 24° C. (75° F.) and 50 percent relative humidity for three days prior to testing.

One of the most important parameters in developing the strength of a cellulose debris-Portland cement composite is the volume percentage of the cellulose debris. For a material consisting solely of Portland cement and dewatered sludge, the maximum tensile strength of approximately 1.9 MPa (275 psi) was developed at a cellulose debris volume of 11 percent, decreasing to 1.2 MPa (175 psi) for cellulose debris volumes of both 9 and 12 percent.

The addition of more cellulose debris to dewatered sludge was not effective in increasing the compressive strength of the composite, as the soft cellulose debris particles were far more compressible than the hardened cement paste. The cellulose debris significantly increased the deformation that a specimen could experience prior to failure in compression.

While the results of this test demonstrated that a useful product could be made from the dewatered sludge, problems were encountered. First, the sludge was dewatered at the secondary fiber recovery facility, sampled from the stockpile, and then shipped to the testing laboratories in sealed, plastic-lined packing boxes. The material had therefore been maintained in an anaerobic condition for up to several weeks prior to mixing with the cement. The delay between sampling and use in the laboratory allowed bacteria in the sludge to reduce $SO_4$ to $H_2S$, creating problems in handling large quantities of the material in the laboratory. Storage under anaerobic conditions is also believed to have led to the partial digestion of the cellulose.

The bacteriological reaction caused a time and temperature dependent reduction in the pH of the sludge that resulted in a variation of pH from sample to sample. For example, during storage for one month at an average temperature of 75° F., the pH dropped from 7.0 to 5.7. Recognizing that this could affect the rate of hydration of the cement, which is influenced by the chemistry of the pore water, experiments were conducted on the need to buffer the sludge with lime prior to introduction of the cement. It was observed, however, that the pH of the sludge-cement-water mixture was approximately 12.5 within a few minutes of mixing, regardless of the pH of the raw materials. This increase in pH is due to the presence of lime in the cement, and to the liberation of $Ca(OH)_2$ that accompanies the hydration of cement. It is likely that this high pH is bactericidal, and prevents further degradation of the cellulose. It was also observed that the rates of setting and strength development of the cement were slightly retarded, which may be due to the presence of polyelectrolytes that had been introduced for sludge dewatering at the recycling plant, or the chemistry of the sludge itself, or both. This tendency was offset by the use of Type III high early strength cement.

The most significant problem encountered was achieving an intimate mixture of the cement and cellulose debris when using the dewatered sludge. The cellulose debris had a tendency to coalesce or "ball up" instead of uniformly distributing throughout the mix. Microscopic study of these cellulose debris bundles showed them to resemble tightly packed balls of cotton that were sufficiently dense so as to prevent the entry of cement and water into their interior. The high surface roughness of the cellulose debris may be responsible in part for the coalescing of the particles of the debris. Further, the development of these fiber balls is perhaps the reason for the decrease in compressive strength with increasing cellulose debris content and for the decrease in tensile strength above a cellulose debris volume of 11 percent.

EXAMPLE II

Cement was added directly to samples of wet sludge with a 5 percent solids content that had been retrieved from the wastewater treatment process prior to chemical conditioning or mechanical dewatering. A normal Type I Portland cement was used, and the mix proportions were adjusted so as to provide a cellulose debris volume of 11 percent in the final product.

The wet sludge-cement slurry was very fluid, requiring the removal of approximately 600 grams of water per kilogram of slurry (60 percent by weight) in order to achieve a reasonably dense product. Water was first removed from the sludge-cement slurry by means of vacuum screening. The effluent from this process contained 2 percent solids, composed of 99 percent clay and cement grains and 1 percent cellulose. The resulting sludge cake at a solids content of approximately 45 percent was then placed in the vibratory compaction device. The material was poured into a 5 cm- (2 in.-) diameter perforated tube and vibrated under a constant pressure of 0.38 MPa (55 psi) by means of a weighted piston. After 60 minutes of this processing, a cylindrically molded specimen of 65 percent total solids was removed. Of the 35 percent moisture remaining in the mass, about one-third of the water is needed to hydrate the cement (the cement dewatering the mixture in the process). When this technique was attempted without the use of vibration, the cellulose debris was observed to fill the perforations in the tube and thus prevent the further escape of water as well as to restrict movement of the piston. The vibration eliminated these problems and maintained the thixotropic mixture in a semifluid state. While the procedures used to dewater the material in the laboratory were not intended to model larger-scale processes, they were useful schematic representations in that pressure, vibration characteristics, process duration and rates of deformation and fluid escape were measurable. These control parameters can be used as a starting point for the design of other equipment.

The addition of Portland cement prior to dewatering of the slurry allowed a more intimate mixing of the fibers and cement.

Since the dewatering apparatus was more conveniently designed to produce cylindrical specimens than the cubes that had been used earlier, compression test specimens were 5 cm- (2 in.-) diameter cylinders, cut to a length of 10 cm (4 in.) using an ordinary table saw. Since the results of compression tests are strongly influenced by specimen geometry, a direct comparison of Example I and Example II materials required that cylinders also be cast from Example I material in which water and cement were added to dewatered sludge. The results of this comparison show that the Example II material has a compressive strength approximately four times greater than that of the Example I material, which is attributed to the greater homogeneity of the Example II mixture.

Of particular interest in the compression test results is the axial strain capacity of the cellulose debris reinforced cement. Tests were monitored until a strain in excess of 6.5 percent was developed, at which point the tests were terminated. Failure, as described by a sharp decrease in strength with continuing strain, was never observed in compression. This is perhaps more meaningful when expressed in comparison with a typical cement-stone-sand concrete with a maximum compressive strength of 14 MPa (2,000 psi).

The behavior of the material under repeated loading up to the peak stress was essentially the same as for the first load cycle for up to five cycles. Although both direct and split cylinder tensile strength tests were conducted, perhaps the most reliable indications of tensile strength were obtained from flexural tests.

Beams cast from the EXAMPLE II material having a depth of 5 cm (2 in.), a width of 3.8 cm (1.5 in.) and a 25-cm (10-in.) span were loaded in the center. Comparative results show a sharp drop in the load capacity in flexure of conventional cement and sand material, typical of unreinforced, brittle materials, while the fiber-reinforced material flexure load capacity decreased slowly, indicating the tensile contribution of the cellulose debris.

While the present invention has been described with reference to a preferred embodiment, the spirit and scope of the present invention should not necessarily be limited to the specifics of this description.

What is claimed is:

1. A method for making a cementitious composite comprising the steps of:
   providing wastewater sludge from a paper recycling process, the sludge having a waste and solids content that consists essentially of nonfibrous delignified cellulose debris, the cellulose debris being of particles that substantially are less than 5 mm long and having an aspect ratio of less than 100-to-1;
   b) mixing the sludge with Portland cement;
   c) molding the mixture into a desired shape; and
   d) curing the mixture.

2. The method of claim 1 including the step of dewatering the cellulose debris-cement mixture before curing the mixture.

3. The method of claim 1 also comprising the step of adding other mineral constituents before curing the mixture.

4. The method of claim 2 wherein the wastewater sludge has a solids content of about 35 percent.

5. The method of claim 4 wherein the cellulose debris volume content is about 11 percent.

6. The method of claim 5 including the steps of adding water to the mixture and uniformly distributing the cellulose debris in the cement such that the cement intimately contacts the surface of the cellulose debris particles and forms a bond upon curing.

7. The process claimed in claim 6 including dewatering the mixture with the Portland cement.

8. The process claimed in claim 7 wherein the dewatering step is by vacuum dewatering.

9. The process claimed in claim 8 wherein the molding step is by vibratory pressure molding to reduce the water-to-cement ratio.

10. The method for producing cementitious composites claimed in claim 1 wherein the water obtained in steps b and e is used in step c.

11. The method claimed in claim 10 wherein the cellulose volume content is about 11 percent.

12. The method claimed in claim 10 wherein the forming step is by vibratory pressure molding to reduce the water-to-cement ratio of the dewatered mixture.

13. The method of claim 2 wherein the cellulose debris volume content in the mixture is from about 5 to 20 percent.

14. The method of claim 13 wherein the solids content of the sludge prior to mixing is about 55 percent cellulose debris and about 45 percent clay including up to about 1% impurities.

15. A method for producing a cementitious composite comprising the steps of:
   a) providing waste water sludge from a paper recycling process, the sludge having water and a solid content that includes delignified cellulosic, the cellulose consisting essentially of nonfibrous particles that are between about 0.06 to about 2.5 mm long and that have an aspect ratio less than 100-to-1;
   b) dewatering the sludge so that the sludge contains no more than 75 percent water;
   c) watering Portland cement;
   d) mixing the dewatered sludge and the watered Portland cement;
   e) dewatering the mixture of sludge and Portland cement;
   f) forming the dewatered mixture into desired shapes; and
   g) curing the dewatered mixture to form the cementitious composites.

16. The method claimed in claim 15 wherein the cellulose debris volume content is from about 5 to about 20 percent.

17. The method claimed in claim 15 wherein the cellulose particles are substantially all from about 0.2 to 4 micrometers wide.

18. A cementitious composite comprising a desired shape of a cured mixture of cellulose, clay and hydrated Portland cement, the cellulose consisting essentially of nonfibrous cellulose debris and the cellulose and clay consisting essentially of particles less than 25 mm in length and having an aspect ratio less than 100-to-1 wherein the cement intimately contacts the surface of the cellulose debris forming a bond.

19. The cementitious composite claimed in claim 18 wherein the particles are all of a length substantially between about 0.06 to about 2.5 mm and a width of from 0.2 to 4 micrometers.

20. The cementitious composite claimed in claim 19 wherein the cellulose debris content in the composite is from about 5 to 20 percent by volume.

21. The cementitious composite claimed in claim 19 wherein the cellulose debris content in the composite is about 11 percent by volume.

22. The cementitious composition claimed in claim 18 wherein the nonfibrous cellulose debris consists essentially of particles that substantially are less than 5 mm long.

* * * * *